US012563359B2

(12) United States Patent
Hur et al.

(10) Patent No.: US 12,563,359 B2
(45) Date of Patent: Feb. 24, 2026

(54) SPATIAL CAPTURE WITH NOISE MITIGATION

(71) Applicant: Apple Inc., Cupertino, CA (US)

(72) Inventors: Yoo Mi Hur, Cupertino, CA (US); Ashrith Deshpande, San Jose, CA (US); Prateek Murgai, Cupertino, CA (US); Joshua D. Atkins, Los Angeles, CA (US); Symeon Delikaris Manias, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 18/458,965

(22) Filed: Aug. 30, 2023

(65) Prior Publication Data

US 2024/0107259 A1 Mar. 28, 2024

Related U.S. Application Data

(60) Provisional application No. 63/376,674, filed on Sep. 22, 2022.

(51) Int. Cl.

*H04S 7/00* (2006.01)
*H04R 3/00* (2006.01)
*H04R 5/027* (2006.01)
*H04S 3/00* (2006.01)

(52) U.S. Cl.

CPC ............. *H04S 7/307* (2013.01); *H04R 3/005* (2013.01); *H04R 5/027* (2013.01); *H04S 3/008* (2013.01); *H04S 2400/01* (2013.01); *H04S 2400/11* (2013.01); *H04S 2400/15* (2013.01); *H04S 2420/11* (2013.01)

(58) Field of Classification Search

CPC ...... H04S 7/307; H04S 3/008; H04S 2400/01; H04S 2400/11; H04S 2400/15; H04S 2420/11; H04R 3/005; H04R 5/027
USPC .................................. 381/56, 71.6, 122, 303
See application file for complete search history.

(56) References Cited

U.S. PATENT DOCUMENTS

2008/0159559 A1* 7/2008 Akagi ................. G10L 21/0208 381/92
2010/0323652 A1* 12/2010 Visser .................... H04R 3/005 455/232.1
2014/0126745 A1 5/2014 Dickins et al.
2021/0271115 A1* 9/2021 Zhang .................. H04R 1/2857
2023/0162750 A1 5/2023 Murgai et al.
2023/0276189 A1* 8/2023 Elff ........................ H04R 1/406 381/303

(Continued)

OTHER PUBLICATIONS

Edwin Tererai Mabande, "Robust Time-Invariant Broadband Beamforming as a Convex Optimization Problem", received from https://typeset.io/papers/robust-time-invariant-broadband-beamforming-as-a-convex-596fx5hozg, Dec. 31, 2014, 212 pages.

(Continued)

*Primary Examiner* — William A Jerez Lora
(74) *Attorney, Agent, or Firm* — Aikin & Gallant, LLP

(57) ABSTRACT

A device may include microphones worn on a head of a user. The device may include a processor, configured to obtain microphone signals from the plurality of microphones. The processor may attenuate breathing sound from the user by processing the microphone signals, resulting in attenuated microphone signals. The processor may render one or more output audio channels based on the plurality of attenuated microphone signals.

18 Claims, 6 Drawing Sheets

(56) References Cited

U.S. PATENT DOCUMENTS

2023/0329913 A1* 10/2023 Li .......................... G10L 15/22

OTHER PUBLICATIONS

Shiota et al., "Voice liveness detection algorithms based on pop noise caused by human breath for automatic speaker verification", received from https://www.researchgate.net/publication/279449066_Voice_liveness_detection_algorithms_based_on_pop_noise_caused_by_human_breath_for_automatic_speaker_verification, Sep. 2015, 5 pages.

Cauchi et al., "Combination of MVDR beamforming and single-channel spectral processing for enhancing noisy and reverberant speech", received from https://asp-eurasipjournals.springeropen.com/articles/10.1186/s13634-015-0242-x, Jul. 23, 2015, 12 pages.

Marvin Tammen, "Extension and Evaluation of Multi-Channel Diffuse PSD Estimators", received from https://uol.de/f/6/dept/mediphysik/ag/sigproc/staff/MarvinTammen/Tammen_-_Extension_and_Evaluation_of_Multi-Channel_Diffuse_.pdf, Jul. 17, 2018, 75 pages.

Kaur et al., "Use of Smartphone's Headset Microphone to Estimate the Rate of Respiration", receive from https://www.researchgate.net/publication/339817838_Use_of_Smartphone's_Headset_Microphone_to_Estimate_the_Rate_of_Respiration, Jan. 2020, 6 pages.

* cited by examiner

SPATIAL CAPTURE WITH NOISE MITIGATION

This non-provisional patent application claims the benefit of the earlier filing date of U.S. provisional application 63/376,674 filed Sep. 22, 2022.

FIELD

One aspect of the disclosure relates to audio processing, in particular, to mitigation of user-based sound or noise for a capture device.

BACKGROUND

Sound may be understood as energy in the form of a vibration. Acoustic energy may propagate as an acoustic wave through a transmission medium such as a gas, liquid or solid. A microphone may absorb acoustic energy in the environment. Each microphone may include a transducer that converts the vibrational energy caused by acoustic waves into an electronic signal which may be analog or digital. The electronic signal, which may be referred to as a microphone signal, characterizes and captures sound that is present in the environment. A plurality of microphones may form a microphone array that senses sound and spatial characteristics (e.g., direction and/or location) of the sound field in an environment.

A processing device, such as a computer, a smart phone, a tablet computer, or a wearable device, can run an application that plays audio to a user. Audio may include sound captured by microphones. For example, a computer can launch an audio application such as a movie player, a music player, a conferencing application, a phone call, an alarm, a game, a user interface, a web browser, or other application that outputs audio (with captured sound) to a user through speakers.

BRIEF SUMMARY

In some aspects, an audio processing device may be configured to obtain a plurality of microphone signals. The microphone signals may be generated by microphones of a capture device. The audio processing device may attenuate non-speech sound (e.g., breathing sound or other oral and nasal sound) from a user by processing the plurality of microphone signals, resulting in a plurality of attenuated microphone signals. The device may render one or more output audio channels based on the plurality of attenuated microphone signals.

The audio processing device may apply one or more attenuation algorithms to the plurality of microphone signals to attenuate non-speech sound from a user while preserving spatial qualities of the microphone signals such as phase relationships between the microphone signals. In such a manner, user breath or other oral or nasal behavior may have a less detrimental effect on other captured sound during playback. This may be especially beneficial where the microphones of the capture device are fixed in close proximity to the user's face. Speech from the user may also be attenuated, but to lesser degree.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
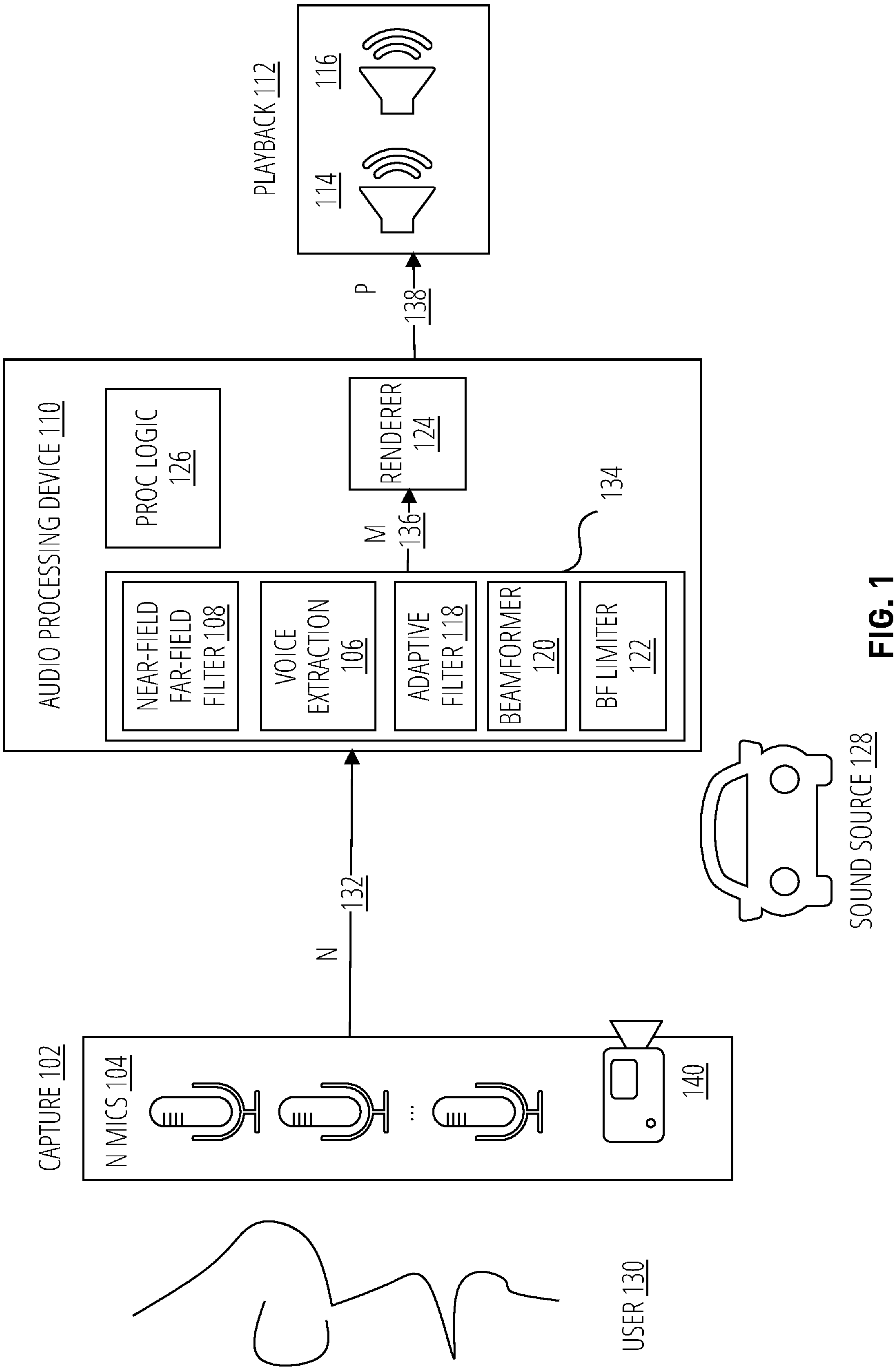
FIG. 1 shows an example of an audio processing device for attenuating non-speech user sound, in accordance with some aspects.

Humans can estimate the location of a sound by analyzing the sounds at their two ears. This is known as binaural hearing and the human auditory system can estimate directions of sound using the way sound diffracts around and reflects off of our bodies and interacts with our pinna. These spatial cues can be artificially generated by applying spatial filters such as head-related transfer functions (HRTFs) or head-related impulse responses (HRIRs) to audio signals. HRTFs are applied in the frequency domain and HRIRs are applied in the time domain.

The spatial filters can artificially impart spatial cues into the audio that resemble the diffractions, delays, and reflections that are naturally caused by our body geometry and pinna. The spatially filtered audio can be produced by a spatial audio reproduction system (a renderer) and output through headphones. Spatial audio can be rendered for playback, so that the audio is perceived to have spatial qualities, for example, originating from a location above, below, or to the side of a listener.

The spatial audio may correspond to visual components that together form an audiovisual work. An audiovisual work may be associated with an application, a user interface, a movie, a live show, a sporting event, a game, a conferencing call, or other audiovisual experience. In some examples, the audiovisual work may be integral to extended reality (XR) environment.

An XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many distinct types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as micro LEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface). Immersive experiences such as an XR environment, or other audio works, may include spatial audio.

Spatial audio reproduction may include spatializing sound sources in a scene. The scene may be a three-dimensional representation which may include position of each sound source. In an immersive environment, a user may, in some cases, be able to move around and interact in the scene.

A capture device may include a plurality of microphones. The microphones may form one or more microphone arrays. The microphones may have fixed positions relative to each other, such that spatial relationships between the microphones may be relied upon for spatial processing of microphone signals generated by the microphones.

With some capture devices, the microphone array may be in close proximity to a user's face. This proximity may be much closer to the user's face than other sounds in the capture environment. The level of acoustic and microphone signals may become unbalanced between sound sources at a distance and sounds from the user. For example, a user's voice and breathing noise may become amplified in the microphone signals due to this proximity, while sounds at a distance (e.g., another person's speech, a musical instrument, a vehicle, or other sound source) may be sensed at a significantly lower level. As the distance between the microphone array and the user's face decreases, the more exacerbated this imbalance may become. Signal processing techniques performed on the microphone signals may further exacerbate the imbalance by inadvertently boosting or otherwise mishandling non-speech sound from the user (e.g., breath or other oral and/or nasal sound).

In some aspects, a method performed by a processing device, comprises obtaining a plurality of microphone signals; attenuating non-speech sound from a user by processing the plurality of microphone signals, resulting in a plurality of attenuated microphone signals; and rendering one or more output audio channels based on the plurality of attenuated microphone signals. The method may apply one or more attenuation algorithms to reduce the non-speech sound from the user. The method may preserve spatial capture in the far field by maintaining the phase relationship between channels to further beam form downstream.

In some examples, the method may perform near field and far field classification on the microphone signals to mask breathing or other oral or nasal sound from the user. For example, attenuating the sound may comprise attenuating one or more of a plurality of time-frequency bins of the plurality of microphone signals in response to the one or more of the plurality of time-frequency bins being classified as near-field. Classifying the one or more of the plurality of time-frequency bins as the near-field may include referencing near-field impulse responses, or far-field impulse responses, or both, to classify each of the plurality of time-frequency bins as being near-field or far-field.

In some examples, the method may steer null pickup at multiple directions to remove undesired sound from the user. For example, attenuating the non-speech sound may comprise applying a multi-channel wiener filter (MWF) to the plurality of microphone signals. The MWF may take an input guidance signal that comprises clean voice of the user and a reduced near-field presence. The input guidance signal may be used by the MWF to steer one or more beamforming nulls at regions in the capture environment to attenuate the user's non-speech sound. The regions may include the user's mouth, noise, and/or other areas from which the sound of the user is present.

The user's non-speech sound that is mitigated may include oral sound and/or nasal sound such as, for example, breathing. In some examples, speech and non-speech sounds are attenuated. Speech may be attenuated less than non-speech sounds. Speech may be separated from non-speech near-field sound. For example, the user's speech may be attenuated to be perceptually even or slightly louder than farther sound sources in the environment. Non-speech oral or nasal sounds may be attenuated at 10 dB or more, 15 dB or more, or 25 dB or more. In other examples, non-speech user sound may be attenuated, and user speech may not be attenuated.

In some examples, the method may further comprise beamforming the plurality of attenuated microphone signals, resulting in a plurality of beamformed signals. The one or more output audio channels may be rendered based on the plurality of beamformed signals. In some examples, the method may comprise attenuating one or more of the plurality of beamformed signals, in response to the one or more of the plurality of beamformed signals satisfying a threshold. The threshold may be satisfied based on a comparison with one or more reference microphone signals, or based on a predetermined loudness threshold, or combination thereof. In some examples, each of the plurality of beamformed signals may represent components of an Ambisonics audio format.

In some examples, the plurality of microphones signal are obtained from a plurality of microphones that are fixed at a front portion of a head of the user. The plurality of microphones signal may be obtained from a plurality of microphones that are fixed within 10 cm of a nose or mouth of the user. In some examples, the microphones may be integral to a head-worn device such as headphones, glasses, or a head-mounted display (HMD).

In some examples, rendering the one or more output audio channels may include generating binaural audio comprising a left audio channel and a right audio channel based on the plurality of attenuated microphone signals. The channels may be used to drive a left ear-worn speaker and a right ear-worn speaker.

In some examples, the method may comprise transmitting the one or more output audio channels to a remote device for playback. Additionally, or alternatively, the output audio channels may be stored in computer-readable memory (e.g., non-volatile computer-readable memory).

In some examples, the one or more output audio channels are associated with a stream of images captured simultaneously with the plurality of microphone signals. The audio channels and the stream of images may form an audiovisual work, which may be played back to a user on a playback device. In some examples, the audiovisual work may be played back in an XR environment.

FIG. 1 shows an example of an audio processing device 110 for attenuating non-speech user sound, in accordance with some aspects. An audio processing device 110 may include processing logic 126 that is configured to perform operations and methods described in the present disclosure. Processing logic 126, which may also be referred to as a processing device, may comprise hardware (e.g., circuitry, dedicated logic, programmable logic, a processor, a central processing unit (CPU), a system-on-chip (SoC), machine-readable memory, etc.), software (e.g., machine-readable instructions stored or executed by processing logic), or a combination thereof.

A capture device 102 may include a plurality of microphones 104. The microphones 104 may form one or more microphone arrays. The microphones 104 may have fixed positions relative to each other on the capture device 102. In some examples, the capture device may be a head-worn device. With some capture devices, the microphone array may be in close proximity to a user's face. This proximity may be much closer to the user's face than other sounds in the capture environment. For example, the capture device may be fixed to a headphone set or head-mounted display (HMD), glasses, or another head-worn device. Some or all of microphones 104 may be fixed at a front portion of a head of a user 130. In some examples, the microphones may be fixed within 20, 15, or 10 cm of a nose or mouth of the user 130. The level of acoustic and microphone signals may become unbalanced for sound sources at a distance and sounds from the user.

With such proximity, a user's voice and breathing noise may become amplified in the microphone signals while sounds at a distance (e.g., another person's speech, a musical instrument, a vehicle, or other sound source) may be sensed at a significantly lower level. As the position of the microphones becomes closer to the user's face, the more exacerbated this imbalance becomes. Further, the user's breath may cause uncorrelated noise.

As such, the strength of the sound from the user 130 may drown out sound from another source (e.g., sound source 128) that is farther away or result in other undesirable audible artifacts. Sounds that do not result from the user's face may be one or more orders of magnitude lower in strength than user sounds such as breathing, coughing, speech, or other oral or nasal sounds from user 130.

Each of the microphones 104 may generate a respective microphone signal that characterizes sensed sound in the environment of the capture device 102. Audio processing device 110 may obtain the plurality of microphone signals 132. The microphone signals may be obtained directly from the capture device 102 or from an intermediary device. In some examples, the audio processing device 110 and the capture device 102 may be the same device. In other examples, they may be separate devices. More generally, the capture device 102, the audio processing device 110, and the playback device 112 may be the same device, separate devices, or partially distributed among a mix of devices.

Processing logic 126 may attenuate sound from a user 130 that is captured in the microphone signals 132, by processing the plurality of microphone signals, resulting in a plurality of attenuated microphone signals 136.

Processing logic 126 may apply one or more attenuation algorithms 134 to reduce the non-speech sound from the user 130. The algorithms may be applied to the microphone signals 132 in series, in parallel, or a combination thereof. In some examples, all the algorithms are applied. In other examples, one or more of the algorithms may be applied to the microphone signals 132.

In some examples, at block 108, processing logic may perform near field and far field classification on the microphone signals 132 to mask breathing or other oral or nasal sound from the user. For example, processing logic 126 may perform time-frequency analysis on each of the microphone signals 132 to separate the signals into a plurality of time-frequency bins. Time-frequency bins may also be understood as time-frequency tiles. In some examples, processing logic 126 may reference near-field impulse responses, or far-field impulse responses, or both, to classify each of the plurality of time-frequency bins as being associated with 'near-field' or 'far-field' sound. Processing logic may attenuate one or more of those plurality of time-frequency bins in response to the one or more of the plurality of time-frequency bins being classified as near-field. The plurality of time-frequency bins may be left alone (e.g., not attenuated) or attenuated less than the near-field time-frequency bins.

Because the relative locations of device components with respect to the various microphones of an electronic device are known and fixed, near-field impulse response functions can be predetermined for each microphone/near-field source pair. Each pair may also have a direction-of-arrival determined for it. In one or more examples, far-field impulse response functions can also be predetermined for one or more far-field locations at which an audio source expected to be located at one or more times during operation of the electronic device.

Processing logic 126 may compare each time-frequency bin to the near-field and far-field impulse responses to determine if the acoustic energy of that time-frequency bin more closely resembles the near-field impulse responses or the far-field impulse responses. Those that more closely resemble the near-field impulse responses may be classified as near-field and those that more closely resemble the far-field impulse responses may be classified as far-field.

In some examples, at adaptive filter 118, processing logic 126 may steer null pickup at one or more directions (e.g., a plurality of nulls at different directions) to remove undesired sounds such as oral and nasal sound from the user 130. For example, at the adaptive filter 118, processing logic may apply an adaptive filter 118 to the microphone signals 132 to attenuate the non-speech sound from the user 130. In some examples, applying adaptive filter 118 may include applying a multi-channel wiener filter (MWF) to the plurality of microphone signals 132 (or an attenuated version of the microphone signals). In some examples, the MWF may take an input guidance signal that comprises clean voice of the user 130 and a reduced near-field presence. In such a manner, the adaptive filter 118 may steer nulls to reduce non-speech sounds while preserving the user's speech.

The clean voice signal may be generated from applying a voice extraction algorithm 106 to the microphone signals (or an attenuated version of the microphone signals). In some examples, the voice extraction algorithm 106 may include a second MWF or other voice extraction algorithm that processes the microphone signals to emphasize speech from user 130 and reduces strength of non-speech sounds. This input guidance signal may be used by the MWF of adaptive filter 118 to determine the directions in which to steer the null pickup beams to further reduce oral and nasal sound from user 130. The MWF may steer nulls at a plurality of regions to attenuate the user's sound in or coming from those regions. The regions may include the user's mouth, noise, and/or other areas from which the sound of the user is present.

The user's sound that is mitigated may include oral sound and/or nasal sound such as, for example, breathing sound. The oral sound may include non-speech sounds as well as speech. In some examples, both speech and non-speech sounds are attenuated. Speech may be attenuated less than non-speech sounds. For example, the user's speech may be attenuated to be perceptually even or slightly louder than farther sound sources in the environment. Non-speech oral or nasal sounds may be attenuated at 10 dB or more, 15 dB or more, of 25 dB or more. In other examples, non-speech sounds are attenuated, and speech is not attenuated.

Processing logic 126 may, in some of the algorithms, preserve spatial capture in the far field by maintaining the phase relationship between each of the microphone signals 132. For example, the block 108, the algorithm 106, and the adaptive filter 118 may preserve spatial capture of the microphone signals 132. The maintained phase relationships in the attenuated microphone signals (with sounds from user 130 being attenuated) allows for processing logic 126 to apply beamforming to the attenuated microphone signals (e.g., at a beamformer 120).

In some examples, processing logic 126 may apply beamforming to the plurality of attenuated microphone signals at the beamformer 120, resulting in one or more beamformed signals. In such a case, the one or more output audio channels 138 may be rendered based on the one or more beamformed signals.

Beamforming may include applying spatial filters to the microphone signals. The spatial filters may include frequency shifts and gains that, when applied to the microphone signals, create constructive and destructive interference in the microphone signals. The resulting beamformed signals emphasize sound pickup in one or more regions of the sensed sound field and de-emphasize sound pickup in one or more other regions. The spatial filters may be designed to create beamformed signals that may each characterize a variety of polar patterns. In some examples, each of the plurality of beamformed signals may represent a unique component of an Ambisonics audio format. For example, beamforming may construct First Order Ambisonics (FOA) signals such as a first beamformed signal representing omni, a second beamformed signal representing left/right, a third beamformed signal representing front/back, and a fourth beamformed signal representing up/down components.

Beamforming may inadvertently emphasize spatially uncorrelated noise such as microphone sensor noise, wind noise, or scratch noise. Some of this uncorrelated noise may result from contact with a user's face, or breath from a user's mouth or nose. For example, if the proximity between the microphones 104 and the face of user 130 is close, then a beamformer may inadvertently emphasize some nasal or oral sounds caused by air movement from the nose or mouth of the user. Undesirable audible artifacts may degrade the quality of output audio channels 138. To mitigate such an issue, processing logic may apply a beamform limiter algorithm, at a beamform limiter 122.

At beamform limiter 122, processing logic may attenuate one or more of the plurality of beamformed signals from the beamformer 120, in response to the one or more of the plurality of beamformed signals satisfying a threshold. In some examples, the threshold may be satisfied based on a comparison with one or more reference microphone signals (which may be any one of microphone signals 132 or a different microphone signal).

For example, if the beamformed signal has more strength or power than one or more reference microphone signals, then the beamformed signal may be attenuated to a level at or near the reference microphone signal. In some examples, a minimum function may be applied to each the one or more beamformed signals such that, for each time-frequency bin, if the beamformed signal has more strength or power than the corresponding time-frequency bin of the reference signal, the beamformed signal is suppressed or attenuated to match the strength or power of the corresponding time-frequency bin of the reference signal.

Additionally, or alternatively, the threshold may be based on a predetermined loudness threshold. For example, if the loudness of a beamformer exceeds the predetermined loudness threshold, then the beamformed signal may be attenuated to reduce the beamformer below the threshold. The attenuation may be performed on a per time-frequency bin basis.

At renderer 124, processing logic 126 may render one or more output audio channels 138 based on the plurality of attenuated microphone signals 136. In some examples, renderer 124 may obtain signals 136 and render them as output audio channels 138 to be used to drive a plurality of speakers 114 and 116. The signals 136 may be attenuated versions of microphone signals 132 or beamformed signals that are output by beamformer 120 and/or beamform limiter 122. In the case where the beamformer 120 and the beamform limiter 122 are not performed, signals 136 represent attenuated microphone signals, and the number M of signals 136 may be the same as N microphone signals 132. In the case where beamforming is performed, then the number M of signals 136 (beamformed signals) may be less than the number N of microphone signals 132.

In some examples, processing logic 126 may spatially render the one or more output audio channels 138 as binaural audio based on the plurality of attenuated microphone signals (e.g., attenuated versions of microphone signals 132 or one or more beamformed signals generated from the attenuated microphone signals). The output audio channels 138 may be used to drive a left ear-worn speaker and a right ear-worn speaker of a playback device. For example, playback device 112 may include a headphone set. A speaker 114 may be integral to an in-ear (e.g., an earbud), on-ear, or over-ear headphones. Similarly, a speaker 116 may be integral to an in-ear headphone (e.g., an earbud), on-ear headphone, or an over-ear headphone. Renderer 124 may apply one or more HRTFs or HRIRs to the attenuated microphone signals or beamformed signals to generate the spatial binaural audio. The spatial binaural audio may preserve the spatial qualities of the sound field as captured by the capture device 102, but with reduced non-speech sounds from user 130 or other passive oral and nasal sounds. Speech from user 130 may also be attenuated, but to a lesser amount than non-speech oral and nasal sounds.

In some examples, the method may comprise transmitting the one or more output audio channels to a remote device for playback. For example, audio processing device 110 and playback device 112 may be separate devices that may be communicatively connected over a wired or wireless such as Ethernet, TCP/IP, Bluetooth, Wi-Fi, or other communication network.

In some examples, the one or more output audio channels 138 may be associated with a stream of images captured simultaneously with the plurality of microphone signals. For example, capture device 102 may include a camera 140 that may simultaneously capture a stream of images. The output audio channels 138 and the stream of images may form an audiovisual work, which may be played back to a user on playback device 112. In some examples, the audiovisual work may be played back in an XR environment.

Figure 2:
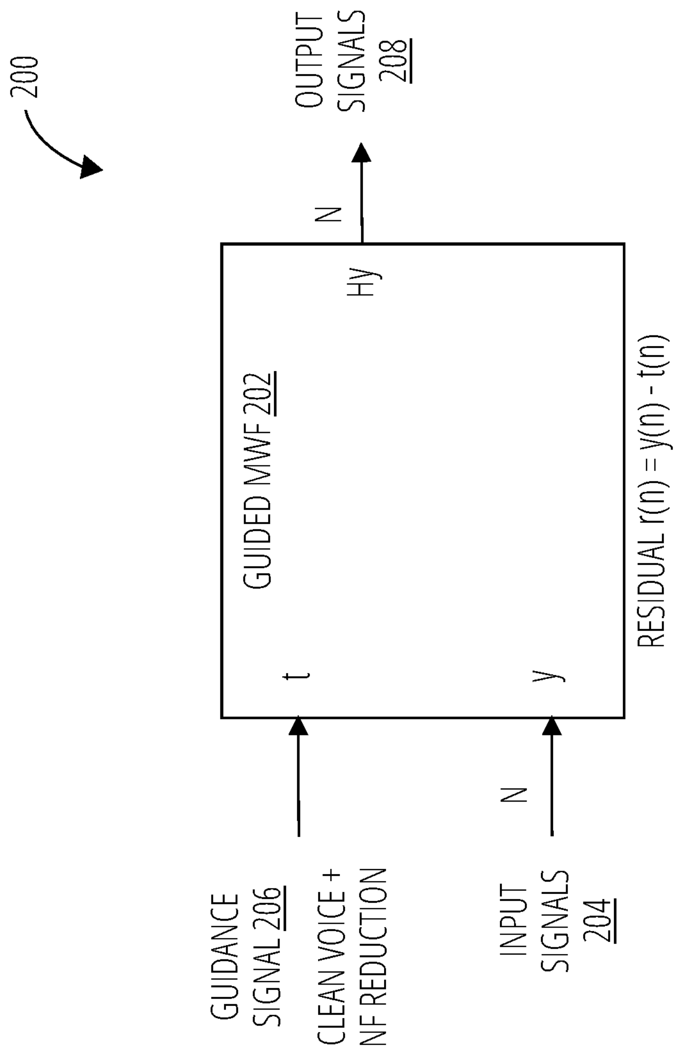
FIG. 2 shows an example of an adaptive filter for attenuating non-speech user sound, in accordance with some aspects.

FIG. 2 shows an example of an adaptive filter 200 that may attenuate non-speech user sound, in accordance with some aspects. The adaptive filter may correspond to adaptive filters in other examples (e.g., in FIG. 1 and FIG. 4).

The adaptive filter may include a guided multi-channel Wiener filter (MWF) that takes N input signals 204. The input signals 204 may represent raw microphone signals or attenuated microphone signals. A MWF may estimate an unknown desired signal such as speech or other sound source, given multiple microphone signals and a reference signal.

The guided MWF 202 may take a guidance signal 206 that includes clean voice and reduced near-field sound. For example, guidance signal 206 may include pre-processing (not shown) with extracted speech combined with the sound field of the input signals with reduced near-field sound. The guided MWF 202 may steer null at multiple directions, to find an optimal arrangement of nulls that, when applied to the input signals 204, result in output signals 208 that most closely replicates the clean voice and reduced near-field sound in the guidance signal 206. The guided MWF 202 may apply statistical techniques to determine steering parameters that steer the nulls at input signals 204, such that residual r(n), which may be expressed as the difference between the input signals 204 and the guidance signal 206, is minimized.

In such a manner, the adaptive filter 200 may generate output signals 208 that represent attenuated microphone signals with removed undesired sound such as non-speech oral and nasal sound from the user 130. In the output signals 208, the adaptive filter preserves user speech and spatial information of the sound field characterized in the input signals 204. With the spatial information intact, output signals 208 may be beamformed downstream, as described in other sections.

Figure 3:
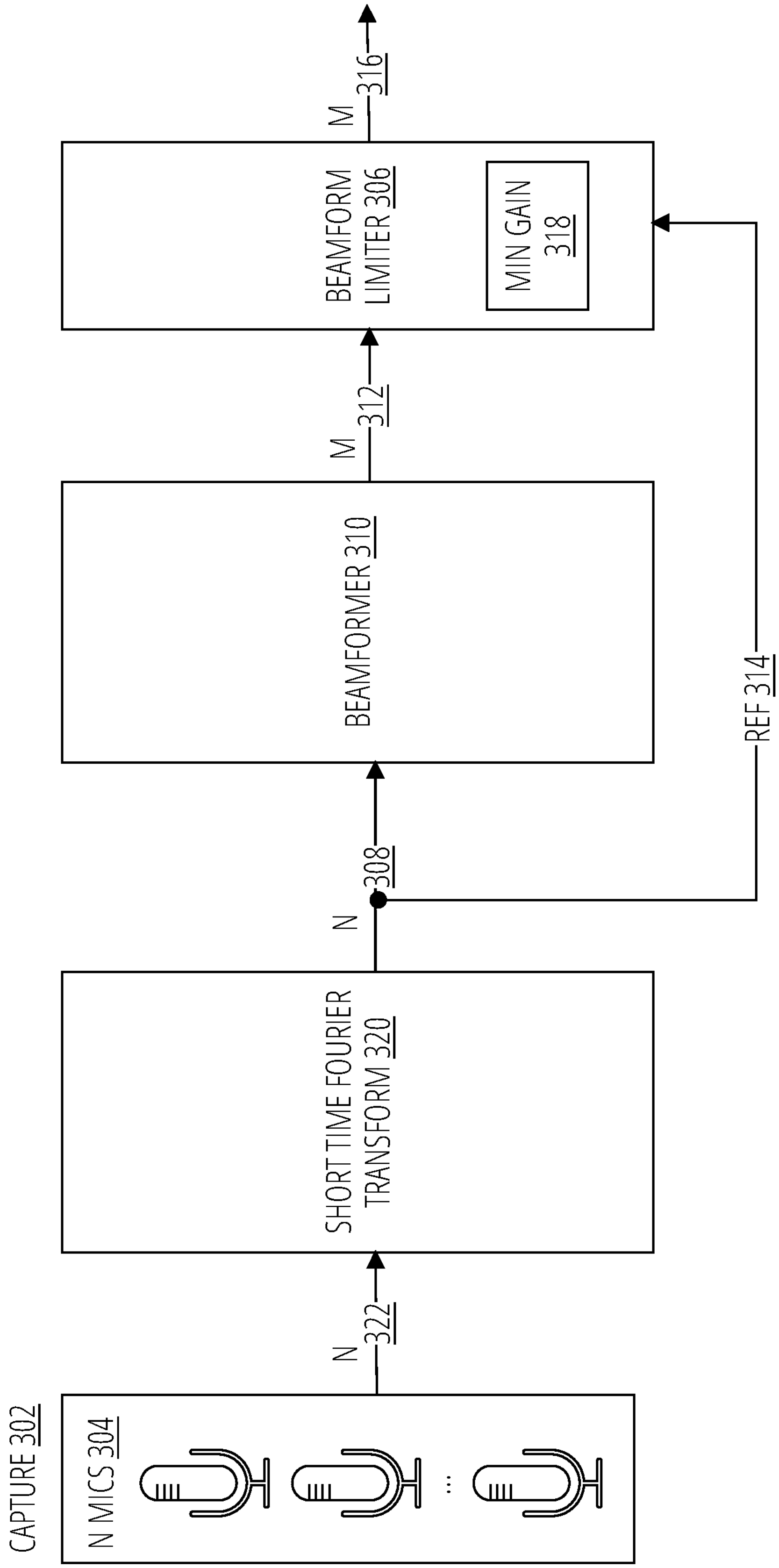
FIG. 3 shows an example of an attenuation algorithm for a beamformed signal, in accordance with some aspects.

FIG. 3 shows an example of an attenuation algorithm with beamformed signals, in accordance with some aspects.

Array signal processing with multiple microphones may be used to obtain desired signals. Various different beamformer techniques may be performed to extract desired signals using multiple microphones. Well-designed beamformers can give an improved directivity performance by rejecting signals from non-target directions. Beamforming may require spatially correlated microphone signals. As such, beamforming may be incapable of removing spatially uncorrelated noise sources such as microphone sensor noise, wind noise, or scratch noise, because there is no spatial information. This problem becomes more challenging in a low frequency range. A microphone array with prohibitively wide spacing may be required to capture spatial information for long wavelengths (corresponding to low frequency noise). A beamformer could inadvertently amplify the spatially uncorrelated noise to achieve the desired directivity. White Noise Gain (WNG) constraints can be applied to prevent the uncorrelated noise boosting, but such a technique may result in a loss of directivity.

Capture device 302 may include N number of plurality of microphones 304. At short time Fourier transform, STFT 320, the time-domain microphone signals 322 are transformed into frequency domain. The input of the STFT 320 in each frame may have the size expressed by (number_of_microphones×number_of_samples) and the output of the STFT 320 may be expressed as (number_of_microphones×number_of_frequency_bins). Better frequency resolution can be achievable with larger frame size, whereas better time resolution can be achievable with smaller frame size.

At beamformer 310, designed filter coefficients may be applied to each of the microphone signals 308 (in the frequency domain) to extract the target signals. Beamformer 310 may include multiple beamformers. For example, four beamformers may be used to construct First-order Ambisonics signals representing omni, left/right, front/back, and up/down components for spatial sound capture. In such a case, the beamform limiter 306 may apply min gain logic 318 to each beamformed signal independently, so that the noise of each beamformer output signal can be further improved.

A beamform limiter 306 may help achieve improved directivity while suppressing the spatially uncorrelated noise boosting which may otherwise result from beamforming in some settings. In some examples, the beamform limiter 306 may include min gain logic 318. Beamform limiter 306 may compare each of the beamformer output signals 312 with a reference microphone signal 314 in each time-frequency bin. The underlying approach of the beamform limiter 306 may be based on the understanding that the power of beamformer output should be lower than that of the beamformer input (e.g., a microphone signal) if there are active sounds received by microphone array. On the other hand, when there is no active sound source, but spatially uncorrelated noise is present in certain time-frequency bins of one or more of the microphone signals 308, the beamformer output signals 312 might have higher power than the input microphone signal due to the noise amplification of this uncorrelated noise. In response to such a case, min gain logic 318 may compare each of one or more beamformer output signals 312 to the input reference microphone signal 314. In response to a beamformer output signal having more strength or power than the input microphone signal (at corresponding time-frequency bins), min gain logic 318 may select the input microphone signal with lower noise, instead of the beamformed signal with amplified noise, and reconstruct an enhanced output without the amplified noise.

In some aspects, beamformer 310 may include a set beamformers to obtain the signals of certain desired directions in the format of Ambisonics. The beamform limiter 306, however, may be applicable to a variety of applications using a variety of beamforming designs and is not limited to beamforming in an Ambisonics domain.

At beamform limiter 306 min gain logic 318 may be applied between each beamformer signal and input reference microphone signal 314 independently. The reference microphone signal 314 may be one of the microphone signals used at the input of beamformer 310. After comparing the power or strength between the reference signal and the beamformed signal at each time-frequency bin, the beamform limiter 306 may use the minimum value (e.g., a power or strength) of the two, and reconstruct an enhanced output signal at the minimum value.

In some examples beamform limiter 306 may include configurable settings. For example, settings of the beamform limiter may define a frequency range that the beamform limiter will be performing this comparison logic on. Outside frequency ranges may not be susceptible to such uncorrelated noise, and thus, processing bandwidth may be conserved by not checking these frequency ranges. Additionally, or alternatively, to minimize the time-frequency artifact in diffuse condition, a smoothing factor might be also introduced to adjust the amount of level change or how fast the level change may be implemented.

The beamform limiter 306 may attenuate or suppress uncorrelated noise in the one or more beamformer output signals 312, resulting in enhanced one or more beamformer signals 316. In such a manner, the beamform limiter 306 may reduce uncorrelated noise boosting in the beamformer output signals 312. The beamform limiter 306 may improve the directivity of beamformer in low frequencies by relaxing the White Noise Gain (WNG) constraint, which is particularly useful for a system having microphones with a small aperture. Such a beamform limiter may be applied to a single beamformer or a set of beamformers (e.g., multiple beamformed signals).

Figure 4:
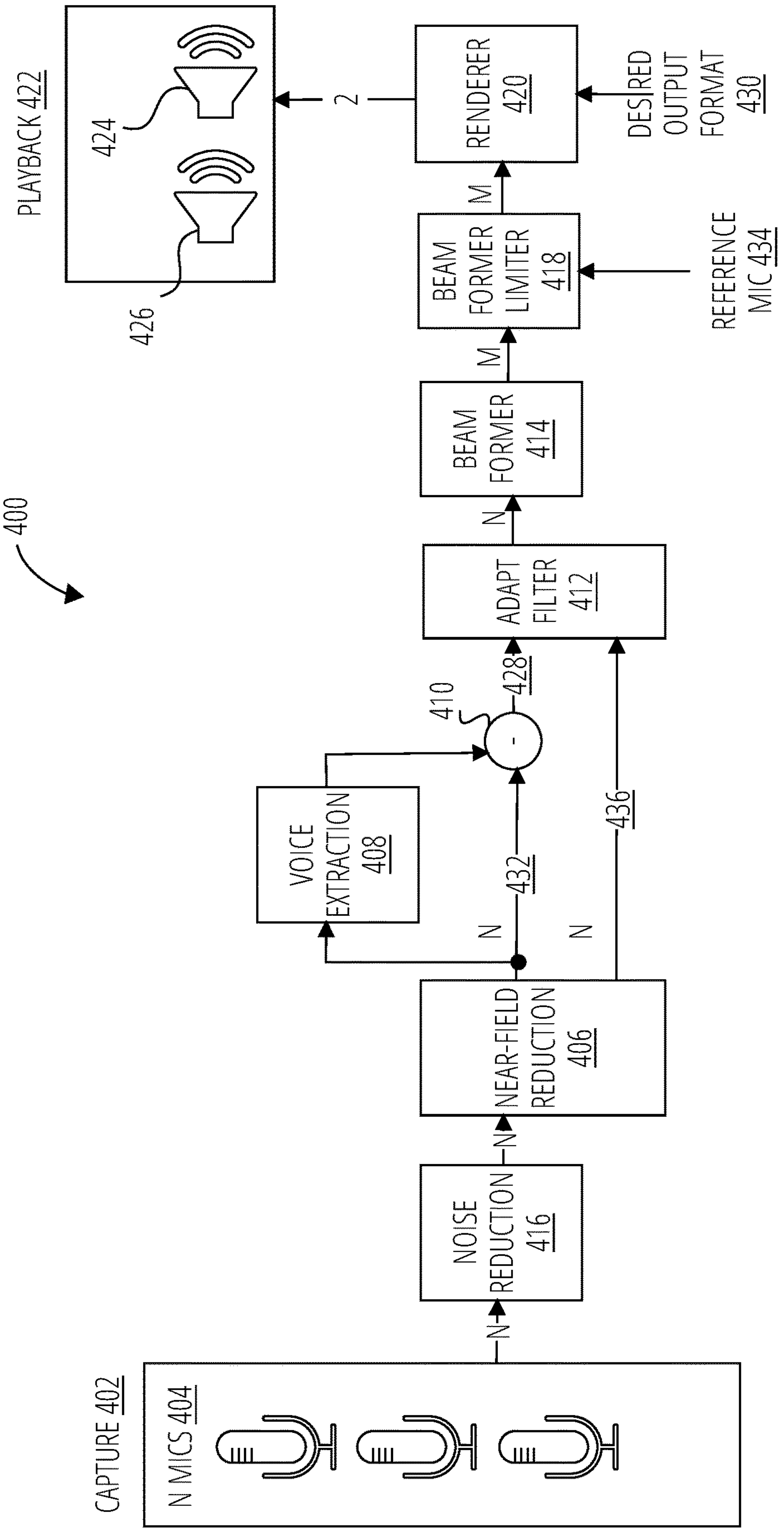
FIG. 4 shows an example workflow for attenuating non-speech user sound, in accordance with some aspects.

FIG. 4 shows an example workflow 400 for attenuating non-speech user sound, in accordance with some aspects.

A capture device 402 may include N microphones 404 that sense a sound field in the environment of the capture device. The microphones 404 may each have a fixed and known position on capture device 402, thus forming a microphone array. Each microphone of the microphone array may generate a respective microphone signal, and correlations between the sensed acoustic energy in each of the microphone signals may capture spatial information of the sound field, such as the locations or directions of sound sources relative to the capture device 402.

At noise reduction block 416, the microphone signals may be filtered to reduce noise. One or more noise suppression filters may be applied to each microphone signal to reduce unwanted noise.

At near-field reduction block 406, near field and/or far field classification may be performed on the microphone signals (received from noise reduction block 416). The classification may be performed per time-frequency bin of each microphone signal. Classification may be performed by using near-field impulse responses, or far-field impulse responses, or both, to classify each of the plurality of time-frequency bins as being associated with 'near-field' and/or 'far-field' sound, as described in other sections. Those bins classified as 'near-field' may be attenuated, while the bins not classified as 'near-field' may not be attenuated.

Near-field reduction block 406 may produce two outputs. A near-field reduced signal 432 may represent the near-field time-frequency bins. One or more attenuated microphone signals 436 may represent attenuated versions of the microphone signals from microphones 404, with the near-field bins attenuated.

At block 410, these near-field time-frequency bins may be subtracted from a 'clean voice' signal that is output from voice extraction block 408, to produce a guidance signal 428 that includes clean voice and a reduced presence of other near-field sounds. Voice extraction block 408 may include a MWF that 'finds' the speech signal in the near-field reduced signals 432.

Adaptive filter 412 may use the guidance signal 428 as a reference to further de-emphasize the non-speech near-field sounds in the attenuated microphone signals 436. Adaptive filter 412 may correspond to the adaptive filter in other examples, such as in FIG. 1 and FIG. 2. Adaptive filter 412 may generate N attenuated microphone signals that preserve the spatial qualities of the original microphone signals. As described, adaptive filter 412 may include a guided MWF which uses the guidance signal 428 to steer nulls to further attenuate non-speech user sound, while preserving speech.

At beamforming block 414, spatial filters are applied to the attenuate microphone signals to produce M beamformed signals. The beamformed signals may, in some examples, each represent a different Ambisonics component of an Ambisonics format (e.g., FOA). Other beamform signal patterns may be implemented as well.

At beamform limiter block 418, each beamformed signal may be attenuated in response to the beamformed signal satisfying a threshold. This may be performed per time-frequency bin. Each time-frequency bin may be compared to a corresponding time-frequency bin of a reference microphone signal 434, as described. The time-frequency bin of the beamformed signal may be attenuated so that it does not become greater in power or strength than the corresponding time-frequency bin of the reference microphone signal 434. In some examples, the reference microphone signal may be a microphone signal from one of microphones 404. The microphone that is farthest away from the mouth and/or nose of the user may be selected as the reference microphone.

Renderer 420 may render the limited beamformed signals to conform to a desired output format 430. In some examples, the desired output format 430 may be a multi-speaker layout (e.g., 5.1, 6.1, 7.1, etc.). In such a case, the renderer 124 may include an encoder that spatially maps the limited beamformed signals to each channel of each speaker.

In other examples, the desired output format 430 may be spatial (binaural) audio. In such a case, a spatial encoder may encode the limited beamformed signals according to one or more HRTFs or HRIRs to reproduce the limited beamformed signals with spatial cues as a left and right audio channel to be worn in, on, or over a user's ears.

Further, the desired output audio may, in some examples, include stereo or mono. Even if not spatialized, the output audio may still benefit from increased clarity of speech, reduced non-speech sounds of a user, and reduced uncorrelated noise.

A playback device 422 may include one or more speakers such as speakers 426 and 424 that match the desired output format 430. In some examples, the playback device 422 may be a head-worn device that plays binaural audio to a listener through a left ear-worn speaker and a right ear-worn speaker. In another example, the playback device 422 may include one or more independent stationary loudspeakers.

Figure 5:
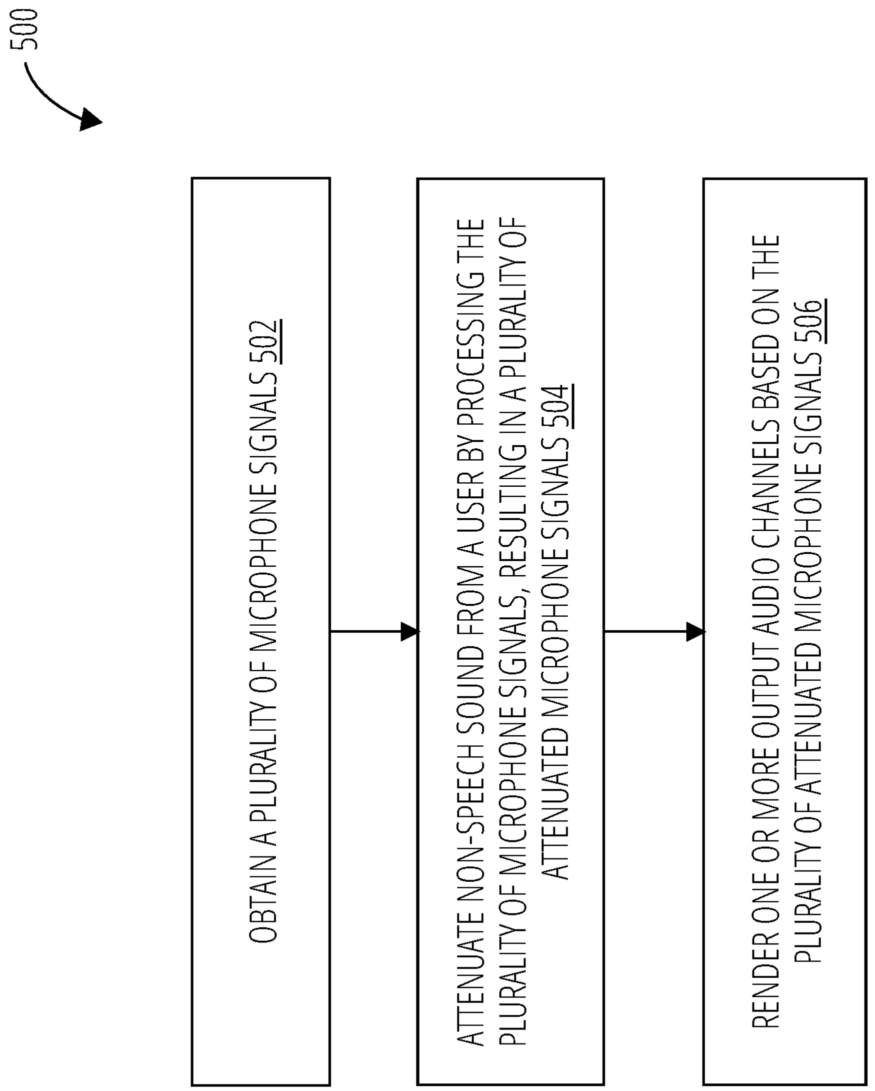
FIG. 5 illustrates an example of a method for attenuating non-speech user sound, in accordance with some aspects.

FIG. 5 illustrates an example of a method 500 for attenuating user sound, in accordance with some aspects. The method may be performed with various aspects described. The method may be performed by processing logic of a capture device, an audio processing device, or a combination thereof. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

At block 502, processing logic may obtain a plurality of microphone signals. Each of the microphone signals may be generated by respective microphones of a microphone array. Spatial information of a sound scene may be contained in correlations (e.g., phase and amplitude differences) between the microphone signals.

At block 504, processing logic may attenuate non-speech sound from a user by processing the plurality of microphone signals, resulting in a plurality of attenuated microphone signals. Processing logic may perform one or more attenuation algorithms (e.g., algorithms 134) as described in FIG. 1, FIG. 2, FIG. 3, or FIG. 4, to attenuate non-speech sound from the user. Speech may be attenuated as well, although at a lesser amount than non-speech sound such as breathing noise or other non-speech oral or nasal sound.

At block 506, processing logic may render one or more output audio channels based on the plurality of attenuated microphone signals. The one or more output audio channels may be rendered according to a desired output format. The output audio channels may be stored in computer-readable memory for retrieval at a later time, streamed or transmitted to a remote device, and/or played back immediately by a playback device.

Figure 6:
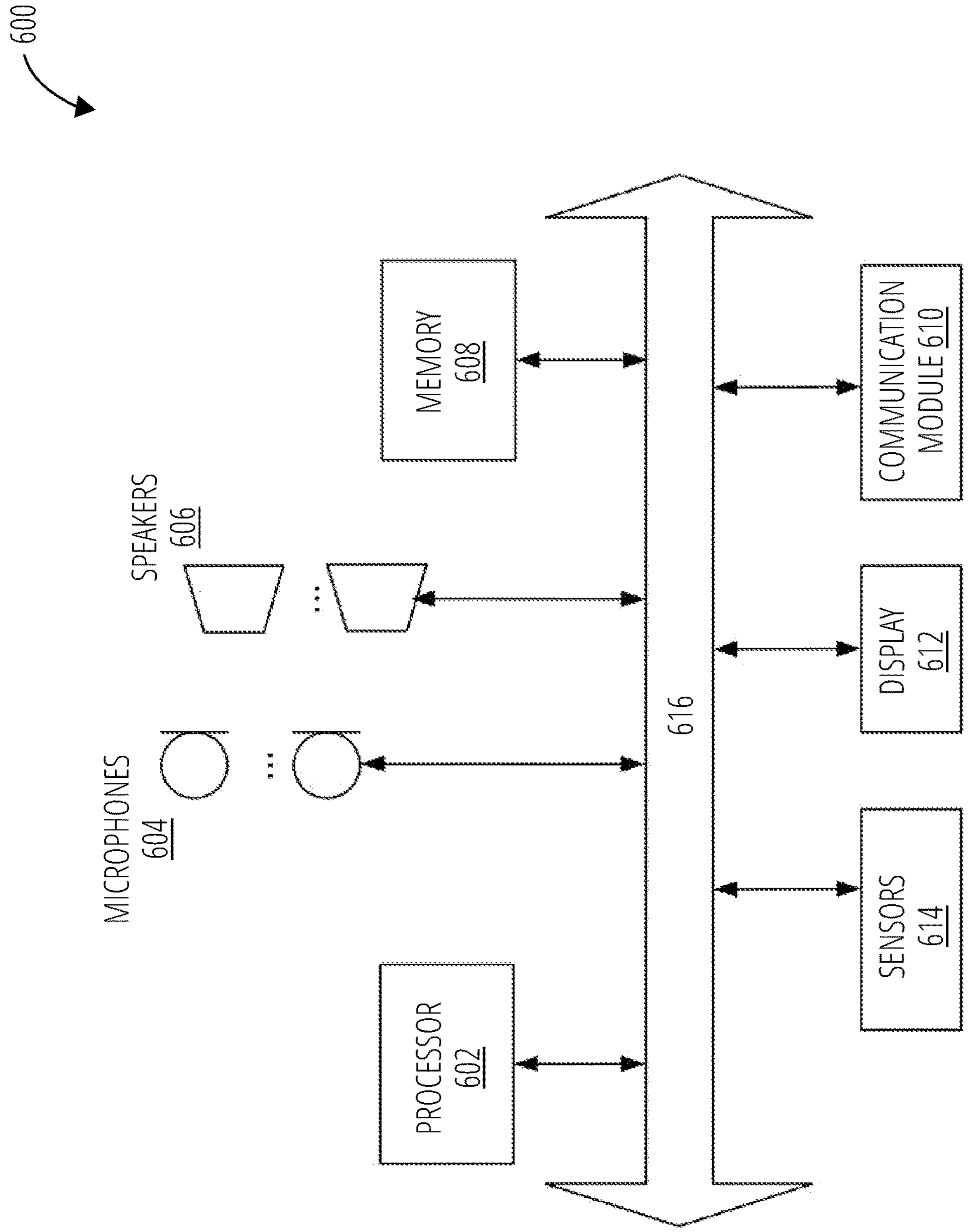
FIG. 6 illustrates an example of an audio processing system, in accordance with some aspects.

FIG. 6 illustrates an example of an audio processing system 600, in accordance with some aspects. The audio processing system can be an electronic device such as, for example, a desktop computer, a tablet computer, a smart phone, a computer laptop, a smart speaker, a media player, a household appliance, a headphone set, a head mounted display (HMD), smart glasses, an infotainment system for an automobile or other vehicle, or other computing device. The system can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated if other types of audio processing systems that have fewer or more components than shown can also be used. Accordingly, the processes described herein are not limited to use with the hardware and software shown.

The audio processing system can include one or more buses 616 that serve to interconnect the various components of the system. One or more processors 602 are coupled to bus as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 608 can include Read Only Memory (ROM), volatile memory, and non-volatile memory, or combinations thereof, coupled to the bus using techniques known in the art. Sensors 614 can include an IMU and/or one or more cameras (e.g., RGB camera, RGBD camera, depth camera, etc.) or other sensors described herein. The audio processing system can further include a display 612 (e.g., an HMD, or touchscreen display).

Memory 608 can be connected to the bus and can include DRAM, a hard disk drive or a flash memory or a magnetic optical drive or magnetic memory or an optical drive or other types of memory systems that maintain data even after power is removed from the system. In one aspect, the processor 602 retrieves computer program instructions stored in a machine readable storage medium (memory) and executes those instructions to perform operations described herein.

Audio hardware, although not shown, can be coupled to the one or more buses in order to receive audio signals to be processed and output by speakers 606. Audio hardware can include digital to analog and/or analog to digital converters. Audio hardware can also include audio amplifiers and filters. The audio hardware can also interface with microphones 604 (e.g., microphone arrays) to receive audio signals (whether analog or digital), digitize them when appropriate, and communicate the signals to the bus.

Communication module 610 can communicate with remote devices and networks through a wired or wireless interface. For example, communication modules can communicate over known technologies such as TCP/IP, Ethernet, Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses can be connected to each other through various bridges, controllers and/or adapters as is well known in the art. In one aspect, one or more network device(s) can be coupled to the bus. The network device(s) can be wired network devices (e.g., Ethernet) or wireless network devices (e.g., Wi-Fi, Bluetooth). In some aspects, various aspects described (e.g., simulation, analysis, estimation, modeling, object detection, etc.) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any particular source for the instructions executed by the audio processing system.

In the description, certain terminology is used to describe features of various aspects. For example, in certain situations, the terms "module," "processor", "unit," "renderer," "system," "device", "filter", "engine", "block", "detector", "beamformer", "limiter", "model", and "component", are representative of hardware and/or software configured to perform one or more processes or functions. For instance, examples of "hardware" include, but are not limited or restricted to, an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method performed by a processing device, comprising:

obtaining a plurality of microphone signals;

attenuating non-speech sound from a user by processing the plurality of microphone signals, resulting in a plurality of attenuated microphone signals;

beamforming the plurality of attenuated microphone signals, resulting in a plurality of beamformed signals;

attenuating one or more beamformed signals, of the plurality of beamformed signals in response to the one or more beamformed signals satisfying a threshold, to produce a plurality of attenuated beamformed microphone signals; and rendering one or more output audio channels based on the plurality of attenuated beamformed microphone signals.

2. The method of claim 1, further comprising:

classifying one or more time-frequency bins, of a plurality of time-frequency bins of the plurality of microphone signals, wherein attenuating the non-speech sound comprises attenuating the one or more time-frequency bins in response to the one or more time-frequency bins being classified as near-field.

3. The method of claim 2, wherein classifying one or more time-frequency bins comprises referencing near-field impulse responses, far-field impulse responses, or both, to classify each of the one or more time-frequency bins as the near-field or as a far-field.

4. The method of claim 1, wherein attenuating the non-speech sound comprises applying a multi-channel wiener filter (MWF) to the plurality of microphone signals.

5. The method of claim 4, wherein applying the MWF takes an input guidance signal that comprises clean voice of the user and a reduced near-field presence.

6. The method of claim 4, wherein the MWF steers nulls at a plurality of regions to attenuate the non-speech sound.

7. The method of claim 1, wherein the threshold is satisfied based on a comparison with one or more reference microphone signals.

8. The method of claim 1, wherein each of the plurality of beamformed signals represents components of an Ambisonics audio format.

9. The method of claim 1, wherein the non-speech sound comprises non-speech oral sound or nasal sound.

10. The method of claim 1, wherein the non-speech sound comprises breathing sound.

11. The method of claim 1, wherein the plurality of microphone signals is obtained from a plurality of microphones that are fixed at a front portion of a head of the user.

12. The method of claim 11, wherein the plurality of microphones is fixed within 10 cm of a nose or mouth of the user.

13. The method of claim 1, wherein rendering the one or more output audio channels includes generating binaural audio comprising a left audio channel and a right audio channel based on the plurality of attenuated microphone signals.

14. The method of claim 13, further comprising transmitting the one or more output audio channels to a remote device for playback, the one or more output audio channels associated with a stream of images captured simultaneously with the plurality of microphone signals.

15. A device, comprising:

a plurality of microphones worn on a head of a user; and a processor, configured to:

obtain a plurality of microphone signals from the plurality of microphones;

attenuate breathing sound from the user by processing the plurality of microphone signals, resulting in a plurality of attenuated microphone signals;

beamform the plurality of attenuated microphone signals, resulting in a plurality of beamformed signals;

attenuate one or more beamformed signals, of the plurality of beamformed signals, in response to the one or more beamformed signals satisfying a threshold, to produce a plurality of attenuated beamformed microphone signals; and render one or more output audio channels based on the plurality of attenuated beamformed microphone signals.

16. The device of claim 15, wherein attenuating the breathing sound comprises attenuating one or more time-frequency bins of the plurality of microphone signals in response to the one or more time-frequency bins being classified as near-field.

17. The device of claim 16 wherein the plurality of microphones are fixed at a front portion of the head of the user within 10 cm of a nose or mouth of the user.

18. A non-transitory computer-readable storage medium including instructions that, when executed by a processing device, cause the processing device to:

obtain a plurality of microphone signals from a plurality of microphones fixed to a device;

attenuate non-speech oral sound or nasal sound from a user who is wearing the device, by processing the plurality of microphone signals to result in a plurality of attenuated microphone signals;

beamform the plurality of attenuated microphone signals, resulting in a plurality of beamformed signals, wherein each of the plurality of beamformed signals represents components of an Ambisonics audio format, and spatially rendering one or more output audio channels based on the plurality of beamformed signals.

* * * * *